United States Patent

Posey

(10) Patent No.: US 7,521,103 B2
(45) Date of Patent: Apr. 21, 2009

(54) COATED POLYMERIC FILM WITH OXYGEN BARRIER PROPERTIES

(75) Inventor: Robert Giles Posey, Duncan, SC (US)

(73) Assignee: Mitsubishi Polyester Film, Inc., Greer, SC (US)

( * ) Notice: Subject to any disclaimer, the term of this patent is extended or adjusted under 35 U.S.C. 154(b) by 407 days.

(21) Appl. No.: 11/473,304

(22) Filed: Jun. 22, 2006

(65) Prior Publication Data

US 2007/0031654 A1    Feb. 8, 2007

Related U.S. Application Data

(60) Provisional application No. 60/692,883, filed on Jun. 22, 2005.

(51) Int. Cl.
| B32B 27/08 | (2006.01) |
| B32B 27/30 | (2006.01) |
| B32B 27/32 | (2006.01) |
| B32B 27/36 | (2006.01) |

(52) U.S. Cl. .............. 428/36.6; 428/36.7; 428/36.91; 428/480; 428/483; 525/56; 525/57; 525/60; 525/191; 525/217; 525/221; 525/222; 525/227

(58) Field of Classification Search ................ None
See application file for complete search history.

(56) References Cited

U.S. PATENT DOCUMENTS

| 3,322,553 A | | 5/1967 | Seifried et al. | |
| 4,571,363 A | | 2/1986 | Culbertson et al. | |
| 5,194,492 A | * | 3/1993 | Pinschmidt et al. | 525/60 |
| 5,300,566 A | * | 4/1994 | Pinschmidt et al. | 525/60 |
| 5,491,199 A | * | 2/1996 | Ford et al. | 525/362 |
| 5,492,765 A | * | 2/1996 | Vratsanos et al. | 428/461 |
| 5,776,618 A | * | 7/1998 | Lu | 428/500 |
| 6,559,227 B1 | * | 5/2003 | Mori et al. | 525/60 |
| 6,709,735 B2 | | 3/2004 | Posey et al. | |
| 2005/0020729 A1 | * | 1/2005 | Renz et al. | 523/160 |
| 2005/0043472 A1 | * | 2/2005 | Itou et al. | 524/555 |
| 2006/0116471 A1 | * | 6/2006 | Aoyama et al. | 525/60 |

FOREIGN PATENT DOCUMENTS

| EP | 1661925 | * | 5/2006 |
| GB | 1411564 | | 10/1975 |

OTHER PUBLICATIONS

PCT Search Report and Written Opinion for PCT/US2006/024357, Oct. 16, 2006.
Article—*Application of (Vinyl Alcohol)-(Vinyl Amine) Copolymer*, Polymer Preprints, American Chemical Society, US, vol. 45, No. 1, 2004, pp. 853-854.
ASTM Method D1003-61, Procedure A, Haze and Luminous Transmittance of Transparent Plastics.

* cited by examiner

*Primary Examiner*—Vivian Chen
(74) *Attorney, Agent, or Firm*—Dority & Manning, P.A.

(57) ABSTRACT

A coating compositions for providing substrates with oxygen barrier properties is disclosed. The substrate may be, for instance, a film, such as a polyester film. The coating composition includes a copolymer of maleic acid and acrylic acid and a copolymer of vinyl alcohol and a vinylamine. The barrier coating formed from the coating composition is typically less than about 1 micron in thickness and provides reduced oxygen transmission even at relatively high relative humidities.

28 Claims, 1 Drawing Sheet

COATED POLYMERIC FILM WITH OXYGEN BARRIER PROPERTIES

RELATED APPLICATIONS

The present application is based upon and claims priority to U.S. Provisional Patent Application No. 60/692,883 filed on Jun. 22, 2005.

BACKGROUND OF THE INVENTION

Barrier coatings are desirable for many applications, such as food packaging and other product packaging. These barrier coatings minimize transmission of oxygen, and water vapor to varying degrees, through the coated substrate. For many end uses, it is desirable for the coating to be clear. When the substrate is also clear, as in a transparent polymer film, view through the substrate is not obstructed. However, known barrier coatings have suffered from numerous limitations, including high cost, inadequate transparency and limited barrier properties. In addition, many barrier coatings used in the past are not capable of being recycled, such as some polyvinyl chloride coatings. There is a need for barrier coatings that address one or more of these problems. A need also exists for barrier coatings that are adapted for application to polymer film substrates. Coatings adapted for in-line application during film manufacture are also desirable.

For instance, barrier coatings for films such as polyester films are disclosed in U.S. Pat. No. 6,709,735 entitled "Oxygen Barrier Coating and Coated Film", which issued on Mar. 23, 2004 and which is herein incorporated by reference. More particularly, the '735 patent discloses a barrier coating for films that includes an aqueous solution of a copolymer of maleic acid and acrylic acid in combination with polyvinyl alcohol. The inventions disclosed in the '735 patent represent great advances in the art. The present disclosure is directed to further improvements in barrier coatings for films.

SUMMARY OF THE INVENTION

In general, the present disclosure is directed to an oxygen barrier film. More particularly, the present disclosure is directed to a coating composition that is well suited to coating films for improving the oxygen barrier properties of the film. Of particular advantage, the barrier coating of the present disclosure not only has great oxygen barrier properties at very low thicknesses, but has been found to also have excellent oxygen barrier properties at elevated relative humidities, such as at relative humidities greater than about 30%, such as greater than about 50%. Since the barrier coating serves to prevent oxygen transmission at higher relative humidities, polymer films containing the barrier coating may be particularly well suited for use in food packaging applications, such as in cheese and meat packaging applications.

In one embodiment, for instance, the present disclosure is directed to a coated polymeric film comprising a polymer film and a coating disposed on at least one side of the film. The coating comprises a first polymer reacted with a second polymer optionally using a crosslinker. For example, the first polymer may comprise a copolymer of polyvinyl alcohol and a vinylamine. The second polymer, on the other hand, may comprise a copolymer of a maleic acid and an acrylic acid. The coating is present on the polymer film in an amount sufficient to increase the oxygen barrier properties of the film.

For example, polyester films that include a barrier coating as described above may have an oxygen transmissivity of less than about 4 cc.mil/m$^2$/day/atm at 23° C. and 0% relative humidity. At 50% relative humidity and at 23° C., the coated polyester film may also have an oxygen transmissivity of less than about 6 cc.mil/m$^2$/day/atm, such as less than about 4 cc.mil/m$^2$/day/atm. At 60% relative humidity and at 23° C., the coated polyester film may have an oxygen transmissivity of less than about 8 cc.mil/m$^2$/day/atm, such as less than about 6 cc.mil/m$^2$/day/atm. In fact, even at 70% relative humidity and at 23° C., the coated polyester film may have an oxygen transmissivity of less than 20 cc.mil/m$^2$/day/atm, such as less than about 18 cc.mil/m$^2$/day/atm, such as less than about 15 cc.mil/m$^2$/day/atm.

It should be understood, however, that in addition to polyester films, any suitable polymeric film may be coated in accordance with the present disclosure. Other films that may be coated include, for instance, polyamide films and polyolefin films.

As described above, the barrier coating may comprise a copolymer of polyvinyl alcohol and a vinylamine combined with a copolymer of a maleic acid and an acrylic acid. The copolymer of the polyvinyl alcohol and the vinylamine may be present in an amount from about 35% to about 65% by weight, such as from about 45% to about 55% by weight. The remainder of the coating may comprise the copolymer of the maleic acid and the acrylic acid either alone or in combination with other minor ingredients.

The copolymer of the polyvinyl alcohol and the vinylamine may contain vinylamine in an amount from about 8 mole percent to about 15 mole percent. For example, in one embodiment, vinylamine may be contained in the copolymer in an amount from about 9 mole percent to about 11 mole percent, such as in an amount of about 10 mole percent. The copolymer of the maleic acid and the acrylic acid, on the other hand, may have a weight average molecular weight of from about 3500 to about 5000 and may have an alternating structure.

In addition to the first polymer and the second polymer, the coating may further comprise a crosslinker. The crosslinker, for instance, may comprise a dialdehyde or a hydroxy acid. When using a hydroxy acid, the hydroxy acid may not only include a hydroxy group, but also may include a carboxylic acid group. In one embodiment, the crosslinker may comprise glycolic acid.

Depending upon the crosslinker used and the particular application, the pH of the copolymer of the maleic acid and the acrylic acid may be increased by combining the copolymer with a base prior to being combined with the copolymer of the polyvinyl alcohol and the vinylamine. For example, in one embodiment, a base, such as ammonia may be added to the copolymer of the maleic acid and the acrylic acid so that a solution containing the copolymer has a pH of greater than about 7, such as from about 7.5 to about 8.5. By increasing the pH of the copolymer of the maleic acid and the acrylic acid, the two copolymers do not react in solution but only after the coating has dried on the film. In this manner, the coating composition may be applied to the film and the film may be stretched prior to a reaction occurring between the copolymers. It should be understood, however, that in other embodiments the pH of the coating composition need not to be increased through the use of a base such as ammonia. For example, when using glycolic acid as a crosslinker, the pH of the coating composition may be greater than 7 without the need of adding additional amounts of a base.

In one embodiment, the barrier coating of the present invention may have thickness of less than about 0.3 microns, such as from about 0.01 microns to about 0.15 microns. The barrier coating may also be used in conjunction with metallized layers applied to the polymer film as desired.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
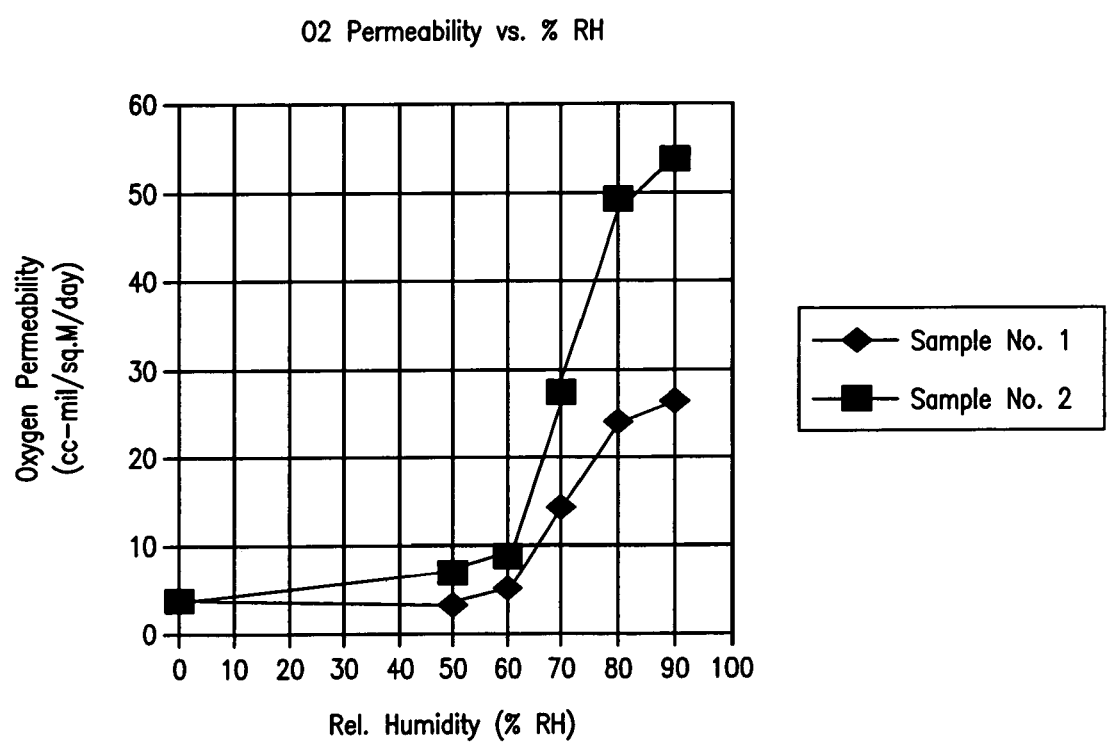
FIG. 1 is a graphical representation of the results obtained in the example.

It is to be understood by one of ordinary skill in the art that the present discussion is a description of exemplary embodiments only, and is not intended as limiting the broader aspects of the present invention.

In general, the present disclosure is directed to an oxygen barrier film. More particularly, the present disclosure is directed to a coating composition that may be applied to various substrates, such as a film, for improving the oxygen barrier properties of the substrate. Of particular advantage, the coating composition is capable of being applied to films as the films are being formed. The coating composition is capable of forming a very thin oxygen barrier layer on the film that does not otherwise adversely affect any of the other properties of the film.

In one embodiment, the coating composition of the present invention contains a mixture of two polymers, such as two copolymers. The first polymer comprises a copolymer of maleic acid and an acetic acid. The second polymer, on the other hand, comprises a copolymer of a vinyl alcohol and a vinylamine. In one embodiment, both copolymers can be blended together in aqueous dispersion and applied to a film substrate generally at any point in the manufacturing process of the film. In one particular application, for instance, the coating composition may be applied to the film prior to stretching the film. In this embodiment, for example, the coating composition is applied to the film and the film is stretched and then heated. During the heating step, volatile components in the coating composition are evaporated causing the barrier layer to form. For example, in one particular embodiment, the pH of the coating composition can be maintained above 7 to prevent reaction between the two copolymers contained in the composition. Once heated as described above, however, the two copolymers can react together to form the oxygen barrier coating.

As described above, one of the copolymers contained in the coating composition comprises a copolymer of maleic acid and acrylic acid. The poly(maleic acid-co-acrylic acid) copolymers, for instance, can have an average molecular weight of about 1500 to about 15,000 and an alternating structure. It is believed that conventional block or random copolymers do not provide enhanced performance. At very high copolymer molecular weights, gelation of the film former can occur. A preferred copolymer is the poly(maleic acid-co-acrylic acid) copolymer commercially available from Sigma-Aldrich of Milwaukee, Wis. under the product number 41605-3. The copolymer may be used at about 35 to about 65 weight percent of the solids of the composition, alternatively at about 40 to about 60 weight percent of the solids of the composition, or further at about 45 to about 55 weight percent of the solids of the composition.

The molecular weight profile of the poly(maleic acid-co-acrylic acid) used in the coating of the present invention may have an impact on the resulting coated film. Free maleic acid forms maleic anhydride in the heat of the tentering, potentially causing irritation. As typically provided, e.g., from Sigma-Aldrich, the average molecular weight (all molecular weights referenced in this disclosure are weight average molecular weights unless explicitly noted to the contrary) is approximately 3000, and the molecular weight distribution includes numerous low molecular weight fractions. It has surprisingly been found that higher average molecular weight polymers, preferably about 3500 to about 5000 average molecular weight, alternatively about 3700 to about 4700 average molecular weight, permit the formation of a viable coating with minimal off-gassing. In an alternate embodiment, a similar result can be achieved by subjecting the poly (maleic acid-co-acrylic acid) to a steam stripping or distilling process (collectively referred to as stripping), preferably azeotropic distillation, to remove substantial amounts of low molecular weight fractions. Preferably, fractions of molecular weight of about 500 or below are targeted and removed by this process. A conventional steam stripping process as is known in the art may be used.

The copolymer of maleic acid and acetic acid as described above is combined with a copolymer of a vinyl alcohol an a vinylamine to form the coating composition of the present invention. The copolymer of the vinyl alcohol and vinylamine may be, for instance, a random copolymer and may contain vinylamine in an amount from about 8 mole percent to about 15 mole percent, such as from about 9 mole percent to about 12 mole percent. In one particular embodiment, for instance, the random copolymer may contain vinylamine in an amount of about 10 mole percent.

One process for producing a random copolymer of vinyl alcohol and a vinylamine is disclosed in U.S. Pat. No. 6,559,227, which is incorporated herein by reference. The products produced by the process disclosed in the '227 patent are well suited for use in forming coating compositions in accordance with the present invention. As disclosed in the '227 patent, the process generally includes the steps of hydrolyzing a copolymer comprising an N-vinylamide unit and a vinyl acetate unit while dispersed in water under a basic condition. The N-vinylamide unit can be provided, for instance, from N-vinylformamide or N-vinylacetamide. During the process, the vinyl acetate and the N-vinylamide undergo hydrolysis to a degree of at least about 70% or more, such as about 90% or more, such as about 95% or more. The weight average molecular weight of the resulting copolymer may vary depending upon various factors. In one embodiment, for instance, the weight average molecular weight may be greater than about 80,000, such as greater than about 90,000.

During the above process, the molar ratio of the N-vinyl amide unit and the vinyl acetate unit in the copolymer can range from about 1:99 to about 50:50, such as from 5:05 to 50:50. If desired, the starting copolymer may further comprise other arbitrary monomer units as long as the desired characteristics of the resulting polymer are not impaired. The content of the other monomer units can be 30 mol percent or less based on the total monomer units.

As described above, the hydrolysis may be carried out under a basic condition. The basic condition can be created by adding a strong alkali, such as a caustic alkali. Examples of a caustic alkali include caustic soda or caustic potash. The alkali is usually added in an amount from 0.1 to 10 equivalents, such as from 0.5 to 5 equivalents per equivalent of the total monomers.

At the end of hydrolysis, the reaction mixture is generally a slurry. The slurry can be cooled and the solid can be separated from the liquid by any suitable means. Subsequently, the collected polymer can be washed to remove any impurities.

Washing can be effected with a washing liquid comprising at least one member selected from 1) an alcohol, 2) cold water at 20° C. or lower, or 3) salt water in order to remove the impurities in the polymer with a minimized polymer loss.

Other methods for producing copolymers of vinyl alcohol and vinylamine are also disclosed in U.S. Pat. No. 5,300,566, U.S. Pat. No. 5,194,492, and U.S. Pat. No. 5,491,199, which are all incorporated herein by reference.

For example, the '566 patent describes a process for producing a copolymer having the following general formula:

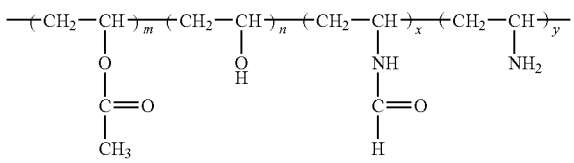

Where m is 0 to 15 mole %
n is 50 to 99 mole %
x is 0 to 30 mole % and
y is 1 to 50 mole %.

In the '566 patent, the copolymer is produced by a two phase hydrolysis in an alcohol, such as methanol. More particularly, the process includes the steps of continuously feeding vinyl acetate monomer and N-vinyl formamide monomer into a reaction mixture in a reaction vessel. The vinyl acetate and N-vinyl formamide are copolymerized to yield poly(vinyl acetate)-co-poly(N-vinyl formamide). The above copolymer is then withdrawn from the reaction vessel and the acetate functionality of the copolymer is hydrolyzed in a methanolic medium to yield a vinyl alcohol copolymer as a gel swollen with methanol and methyl acetate. The gel is then comminuted to give a particulate copolymer product.

The particulate copolymer product can optionally be rinsed with methanol and then hydrolyzed as a slurry in methanol with an acid or base to produce PVOH/PVAm particles. The PVOH/PVAm particles can be washed with methanol to remove soluble salts and byproducts. The resulting copolymer can then be dried and used as desired. The resulting copolymer can have any suitable molecular weight, such as an average molecular weight ranging from about 10,000 to about 200,000.

Suitable free radical initiators for the polymerization reaction include organic peroxides. The initiator can be present in the reaction mixture in an amount up to about 2% by weight.

In U.S. Pat. No. 5,491,199, an essentially salt-free vinylamine copolymer such as a copolymer of vinyl alcohol and N-vinyl formamide is produced by heating the starting materials in an aqueous solvent medium in the presence of a catalyst comprising a transition metal which is a member of either the first transition series or of Group VIII. Within this class, the catalyst can comprise any metal or metal complex including oxidized metals. Catalysts which comprise members of Group VIII include those containing palladium, platinum or rhodium. Metals in the first transition series include vanadium, chromium, manganese, copper, and zinc. The reaction is allowed to proceed for about 0.25 to 12 hours.

The aqueous medium can be at least about 50 mole percent water, although other solvents such as alcohols may be present. The catalyst can be present in a concentration of from about 5 to about 70 mole percent based upon the concentration of the starting polymer. The reaction may be carried out as either a batch or a continuous process.

According to the '199 patent, the above process converts N-vinyl formamide polymers to the corresponding salt-free vinylamine polymers in a single step without the need for removal of coproduct salts.

Copolymers of vinyl alcohol and vinylamine are available from various commercial sources. In one particular embodiment, for instance, DIAFIX copolymer obtained from the Mitsubishi Chemical Corporation may be used to form coatings in accordance with the present invention.

In U.S. Pat. No. 6,709,735, an oxygen barrier coating composition is disclosed comprising the combination of a copolymer of maleic acid and acrylic acid and polyvinyl alcohol. Although the coating composition disclosed in the '735 patent provided great advances in the art, the present inventor has discovered that even better oxygen barrier properties are obtained when using a copolymer of vinyl alcohol and a vinylamine. As well be described in greater detail below, the improvements in oxygen barrier properties are especially noticeable at relatively high relative humidities, such as at relative humidities greater than about 50%. Thus, the coating compositions of the present invention are better suited for use in high relative humidity applications, such as in meat and cheese packaging materials.

In addition of the two different copolymers described above, the coating composition can include numerous other ingredients and components. For example, in one embodiment, a crosslinker may be added to the coating composition. In one embodiment, for instance, a dialdehyde crosslinker may be used.

In an alternative embodiment, the crosslinker may comprise a hydroxy acid, such as an alpha hydroxy acid or a beta hydroxy acid. The hydroxy acid, for example, may contain a carboxylic acid group. In one particular embodiment, the crosslinker may comprise glycolic acid.

The crosslinker may be present at about 3 to about 15 percent by weight based on solids. For example, when glycolic acid is used as the crosslinker, the glycolic acid may be present in an amount from about 10% to about 12%. A dialdehyde crosslinker, on the other hand, may be present in an amount from about 4% to about 6%.

A defoamer may also be added to the coating composition. Non-silicone, hydrocarbon-based alcohol defoamers are preferred. Preferably, an acetylene-type, single component defoamer is used. A preferred, proprietary defoamer is available from Transchemco as Trans280. It is preferable to use as little defoamer as possible. Approximately 50 parts per million based on solids of coating provides good results.

In addition, a surfactant can be added to the coating. Furthermore, a starch can be added to the coatings of the present invention. Preferred starches for use in the coatings of the present invention include cold water soluble starches. Antimicrobials, such as triclosan or methylparaben, can also be included (the preferred polyvinyl alcohol includes a trace amount of biocide). Other plasticizers, such as glycerin, may also be added to the coatings of the present invention.

Thus, a polymer film coated with a barrier coating of the present disclosure (often at greatly reduced thicknesses) is ideally suited for food packaging and is believed to be suitable for other uses requiring food contact or contact with other ingestible substances such as pharmaceuticals. The coated film has excellent resistance to both solvents and water.

In one embodiment, coating composition according to the present invention may include from about 3% to about 7% by weight, such as from about 4% to about 6% by weight of the copolymer of vinyl alcohol and vinylamine and may contain from about 3% to about 7% by weight, such as from about 4% to about 6% by weight of the copolymer of maleic acid and an acetic acid.

The ingredients of the barrier coating are preferably formulated as a dispersion or solution in water or a water-containing solvent. Alternatively, alcohols or other suitable organic solvents can be employed, alone or in combination with water. The solids level is preferably up to about 50 weight percent, alternatively about 0.01 to about 30 weight percent, more preferably about 5 to about 15 weight percent.

In one embodiment, a pH adjuster may be added to the coating composition in order to increase the pH of the composition. More particularly, the pH adjuster may be combined with the copolymer of maleic acid and acetic acid in order to prevent a reaction from immediately occurring between the above copolymer and the random copolymer of vinyl alcohol and vinylamine. In general, any suitable pH adjuster or base may be combined with the copolymer of maleic acid and acetic acid in order to increase the pH of an aqueous dispersion containing the copolymer to greater than about 7, such as greater than about 7.5 or 8. In one particular embodiment, for instance, ammonia may be combined with the copolymer of maleic acid and acetic acid.

In other embodiments, a pH adjuster may not be necessary. For example, the present inventor has discovered that when using glycolic acid as a crosslinker, the pH of the coating composition may be maintained at greater than about 7 without the need of adding a pH adjuster.

When the pH is maintained about 7, reaction between the copolymers does not occur until various components are evaporated, such as during drying. By maintaining the pH above 7, therefore, various benefits and advantages can be achieved.

For example, in one particular embodiment, the coating composition may be applied as an aqueous dispersion to a film prior to stretching the film. The film can then be stretched and heated on, for instance, a tenter frame. In this manner, the oxygen barrier layer of the present invention is not formed until after stretching has occurred.

One benefit of the coatings of the present invention is their ability to achieve good oxygen barrier properties with reduced coating thicknesses. The coating amount needed is reduced, which minimizes cost, improves transparency and optimizes the coated film or other substrate for packaging applications. While greater thicknesses may be used and are desirable for certain applications, coating thicknesses in the range of about 0.01 to about 1 micron thick are preferred. Alternately, thicknesses of about 0.001 to about 0.3 microns are preferred. Thicknesses of about 0.04 to about 0.1 microns are typically targeted.

The thickness of the film substrate, on the other hand, may vary depending upon the particular application and the type of polymer used to form the film. In general, the film thickness can be less than about 5 mils, such as less than about 3 mils. For example, in various embodiments, the thickness may be about 2 mils, about 1 mil, or about 0.5 mils.

As described above, barrier coatings made according to the present invention are well suited to significantly inhibiting oxygen flow therethrough. For example, coatings of the present invention are capable of reducing oxygen transmission below about 4 $cc.mil/m^2/day/atm$ at 23° C. and 0% relative humidity.

In addition, coatings made according to the present invention also perform very well at relative high relative humidities. For example, coatings of the present invention at a relative humidity of 25% can have an oxygen transmission of less than about 5 $cc.mil/m^2/day/atm$ at 23° C., such as less than 4 $cc.mil/m^2/day/atm$ at 23° C. At 50% relative humidity, the coatings may also produce an oxygen transmission of less than about 6 $cc.mil/m^2/day/atm$ at 23° C., such as less than about 4 $cc.mil/m^2/day/atm$ at 23° C. At 60% relative humidity, the coatings may produce an oxygen transmission of less than about 8 $cc.mil/m^2/day/atm$ at 23° C., such as less than about 6 $cc.mil/m^2/day/atm$ at 23° C. At 70% relative humidity, the coatings may produce an oxygen transmission of less than about 20 $cc.mil/m^2/day/atm$ at 23° C., such as less than about 18 $cc.mil/m^2/day/atm$ at 23° C., such as less than about 15 $cc.mil/m^2/day/atm$ at 23° C.

Coatings of the present disclosure also provide synergies when metallized. Barrier films are often metallized to enhance barrier properties, for aesthetic purposes, or for other reasons. Conventional methods known in the art may be used. Typical metallization levels of approximately 2.4 optical density are frequently used. Metallization is conventionally performed utilizing vacuum deposited aluminum atoms. The resulting layer is formed of the aluminum atoms. Coatings of the present disclosure can provide improvements in barrier properties when metallized, in composition with uncoated films that have been metallized or in comparison with metallized films having conventional metal adhesion undercoatings. Without intending to be bound by theory, it is believed that the coatings of the present invention enable the formation of metal-oxygen bonds that enhance oxygen barrier properties. When present, the metal layer can be placed over a coating made in accordance with the present disclosure, may be applied to the opposite side of the film or may be applied to both sides of the film.

For optimal water vapor barrier properties, the coated polymer film (preferably polyester film) can be laminated to various other polymer films, such as polyolefin films. In addition to improving water vapor properties, other films may be laminated to the coated polymer film in order to seal the coating of the present disclosure to the base film. In one embodiment, for instance, the base film can be laminated to a polyethylene film.

While the films of the present invention may be transparent, the coatings and/or film substrates of the present disclosure do not need to be clear and may in various embodiment be opaque. The two copolymers enable the formation of a transparent coating. Total haze is a preferred method of measuring the clarity of a polyester film, which can determine its suitability for such films as clear barrier film. Haze is measured based on ASTM method D1003-61, Procedure A, "Haze and Luminous Transmittance of Transparent Plastics", using a BYK Gardner "Haze Gard Plau" instrument.

Conventional additives that are known in the art can be included in the barrier coatings of the present invention. For example, pigments, other colorants, stabilizers, antistatic agents, adhesion promoters, antioxidants, delusterants, fillers, plasticizers and the like can be included in the barrier coatings of the present invention. Generally it is preferred that only low levels of such additives be used, if any are used at all.

As mentioned above, while thin coatings are most cost-effective, the barrier coatings of the present invention are suitable for application at much higher levels, and certain coatings may be suitable for co-extrusion.

The coating compositions of the present invention can be formulated by simply combining the desired coating components. Agitation may be used to insure an even dispersion or solution.

Base Film

For many preferred uses of the coating and method of the present invention, a polymer film substrate is most useful. It provides a lightweight, substantially transparent, inexpensive, disposable or recyclable substrate that accommodates many of the end uses of barrier films. In addition, the coated polymer film can easily be laminated by heat bonding or by adhesives to various other substrates.

The barrier coatings and coating methods of the present invention are applicable to any polymeric film capable of acting as a substrate for a barrier coating. For example, the present invention is applicable to polymeric films such as those made from polyamides exemplified by nylon; polyolefins such as polypropylene and polyethylene; polyester such as polyethylene terephthalate; polyacetal; polycarbonate; and the like. The invention is particularly applicable to polyester, most preferably polyethylene terephthalate, polyethylene naphthalate or polybutylene terephthalate. The present invention is also applicable to polymeric films including copolyesters such as polyethylene terephthalate isophthalate. A preferred process for forming a base film is set forth in U.S. Pat. No. 5,350,601 to Culbertson et al., incorporated herein by reference. Generally, any polyester film based on a polymer resulting from polycondensation of a glycol or diol with a dicarboxylic acid (or its ester equivalents) such as terephthalic acid, isophthalic acid, sebacic acid, malonic, adipic, azelaic, glutaric, suberic, succinic acids and the like, of mixtures of two or more of the foregoing, are preferred for use in the present invention. Suitable glycols include ethylene glycol, diethylene glycol, polyethylene glycol, and polyols such as butanediol and the like. Mixtures of two or more of the foregoing are also suitable.

Any of the above base polymer films can contain conventional additives such as antioxidants, delusterants, pigments, fillers such as silica, calcium carbonate, kaolin, titanium dioxide, antistatic agents and the like, or mixtures thereof, all of which are well known in the art.

In addition, the base polymer film may be a polymer laminate. Such laminates include polymer-polymer laminates like polyester-polyolefin or polyester-adhesive-polyolefin, polymer-metallic laminates such as polyester-aluminum, or polymer-paper or polymer-adhesive-paper laminates. Coated polymer films or film laminates can also be used. Primer coatings used to enhance wet-out or coating adhesion are preferred examples of such coatings.

The films may be produced by any well known technique in the art. For example, polyester is typically melted and extruded as an amorphous sheet onto a polished revolving casting drum to form a cast sheet of the polymer. The sheet is quickly cooled and then stretch oriented in one or more directions to impart strength and toughness to the film. The sheet is typically stretched from about two to about four times the original cast sheet dimension, in one or both directions. Biaxial orientation is most preferred, with monoaxial orientation being less preferred. Generally, stretching occurs in a temperature range from about the second order transition temperature of the polymer to below the temperature at which the polymer softens and melts. Where necessary, the film is heat treated after stretching to "lock-in" the properties by further crystallizing the film. The crystallization imparts stability and good tensile properties to the film. Such heat treatment for polyester film is generally conducted at about 190° C. to about 240° C. It is preferred that the coated films of the present invention be exposed to heat of about 215° C. to about 225° C. for a period of about 1 to about 20 seconds, alternately for about 2 to about 10 seconds. For thin films, it is preferred that the residence time in the crystallizer that these temperatures be no more than about 5 seconds.

The coated films of the present invention are reclaimable. Waste coated material can readily be incorporated with new resin for re-extrusion.

Alternate Substrates

As discussed above, the coatings and methods of reducing oxygen transmission of the present invention are not limited to use on polymer film bases. Alternate substrates can be coated according to the teachings of the present invention. Any substrates that exhibit oxygen permeability, such as polymeric films, will benefit from the barrier properties of the coating. Furthermore, it is envisioned that polymer films coated with the coatings of the present invention can also be applied to other surfaces, including irregular surfaces, to provide barrier properties to those surfaces. The film may be heat bonded or adhered to the surface, or can be mechanically attached via fasteners, clips and the like.

Coating Methods

In-line coating of the base polymer layer, in which the coatings are applied during the film manufacturing process and before it is heat-set, is the preferred method for use of the coatings disclosed herein. Typically, the base polymer film is coated after corona treatment and prior to the stretch orientation of the film as described in British Patent No. 1,411,564, or coated between drawing steps (when biaxially oriented film is produced) as taught by U.S. Pat. No. 4,571,363, or coated post-draw as taught by U.S. Pat. No. 3,322,553.

In one particular embodiment, the base polymer film is coated prior to stretch orientation with the coating composition. The coating composition includes a pH adjuster that increases the pH of the composition in an amount sufficient to prevent a reaction from occurring between the copolymer of vinyl alcohol and the vinylamine and the copolymer of the maleic acid and acetic acid. After the film is stretched, the film is heated. Heating causes the pH adjuster to evaporate allowing a crosslinking reaction to occur between the two copolymers.

In addition to in-line coating, one or more of the coatings of the present invention may be off-line coated (after manufacturing and heat setting the film), preferably after conventional surface modification of the polymeric substrate has occurred. Thus, the coating and method of the present invention are also intended for use where, for example, the base polymer film is produced and later coated off-line with one or more coatings of the present invention. Alternatively, one or more coatings can be applied in-line, with the remainder being applied off-line. Conventional off-line coating processes include roll coating, reverse roll coating, gravure roll coating, reverse gravure roll coating, brush coating, wire-wound rod (Meyer rod) coating, spray coating, air knife coating, meniscus coating or dipping.

While surface modification of the base polymer film prior to coating is not required, it has been found that better results are obtained if the surface or surfaces of the base polymer film are modified before application of the coatings of the present invention. Conventional surface modification techniques include corona treatment, which is the most common and most preferred procedure for modifying the surface of the polymer base film to enhance coating adhesion. The corona treatment or other surface modification should be sufficient to permit wetting out of the coating. Corona treatment of about 1.0 watt per square foot per minute is typically sufficient to achieve the desired results. In addition, primer or other intermediate layers can optionally be used between the polymer film and the barrier coating.

In light of the foregoing, a preferred method of controlling oxygen transmission through polymer film is provided herein. Preferably, one or both faces of a base polymer film are coated with a barrier coating of the present invention. Optionally, if only one face is coated with the barrier coating of the present invention, this coating can occur before, after or at the same time the opposite face of the base polymer film is coated with an alternate coating.

The present invention may be better understood with reference to the following example.

EXAMPLE

The following example demonstrates some of the benefits and advantages of the present invention.

In this example, a polyester film having a thickness of 0.5 mil was coated in accordance with the present disclosure and then compared to the same polyester film coated with a coating composition made in accordance with the teachings of U.S. Pat. No. 6,709,735. In particular, one sample of the polyester film was coated with a coating composition containing a vinyl alcohol/vinylamine random copolymer and a maleic acid/acetic acid copolymer in a 1:1 ratio. The aqueous coating composition contained 10% solids. The pH of the maleic acid/acetic acid copolymer was first raised to approximately 8.0 with ammonia in order to prevent prereaction with the vinyl alcohol/vinylamine copolymer.

A second sample of the polyester film was coated with a coating composition containing a maleic acid/acetic acid copolymer in combination with polyvinyl alcohol. The polyvinyl alcohol was present in an amount of approximately 30% by weight based upon the amount of the maleic acid/acetic acid copolymer present.

The two samples of polyester film were coated with approximately the same amounts of the coating compositions. The thickness of the coatings was approximately 0.1 microns after being dried.

The film samples were then placed in controlled environments at different levels of relative humidity and tested for oxygen transmission. The results are as follows and are graphically shown in FIG. 1.

| Oxygen Permeability (cc.mil/m$^2$/day/atm) | | |
|---|---|---|
| % Relative Humidity | Sample No. 1 | Sample No. 2 |
| 0 | 4 | 4.1 |
| 50 | 3.46 | 6.86 |
| 60 | 5.01 | 8.79 |
| 70 | 14.4 | 27.4 |
| 80 | 24 | 49.1 |
| 90 | 26.3 | 53.6 |

As shown above, the sample made according to the present disclosure was much more effective at preventing oxygen transmission through the film, especially at higher relative humidities.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A coated polymeric film comprising:
a polymer film; and
a coating disposed on at least one side of the film, the coating comprising a copolymer of vinyl alcohol and a vinylamine reacted with a copolymer of a maleic acid and an acrylic acid, the coating being present in an amount sufficient to increase the oxygen barrier properties of the film.

2. A coated polymeric film as defined in claim 1, wherein the polymer film comprises a polyester film.

3. A coated polymeric film as defined in claim 1, wherein the copolymer of vinyl alcohol and a vinylamine comprises from about 8 mole percent to about 15 mole percent vinylamine.

4. A coated polymeric film as defined in claim 1, wherein the copolymer of a maleic acid and an acrylic acid has an average molecular weight of from about 3500 to about 5000.

5. A coated polymeric film as defined in claimed 1, wherein a coating composition forming the coating contains the copolymer of polyvinyl alcohol and a vinylamine in an amount from about 35% to about 65% by weight of percent solids.

6. A coated polymeric film as defined in claim 1, wherein a coating composition forming the coating contains the copolymer of polyvinyl alcohol and a vinylamine in an amount from about 45% to about 55% by weight of percent solids.

7. A coated polymeric film as defined in claim 1, wherein the coating has a thickness of less than about 0.3 microns.

8. A coated polymeric film as defined in claim 1, wherein the coated polymeric film further comprises a metal layer.

9. A coated polymeric film as defined in claim 1, wherein the coating provides the film with an oxygen transmission rate of less than about 4 cc.mil/m$^2$/day/atm at 23° C. and 0% relative humidity.

10. A coated polymeric film as defined in claim 1, wherein the coating provides the film with an oxygen transmission rate of less than about 6 cc.mil/m$^2$/day/atm at 23° C. and 50% relative humidity.

11. A coated polymeric film as defined in claim 1, wherein the coating provides the film with an oxygen transmission rate of less than about 20 cc.mil/m$^2$/day/atm at 23° C. and 70% relative humidity.

12. A coated polymeric film as defined in claim 1, wherein the coating provides the film with an oxygen transmission of less than about 4 cc.mil/m$^2$/day/atm at 23° C. and 50% relative humidity.

13. A coated polymeric film as defined in claim 1, wherein the coating further comprises a crosslinker.

14. A coated polymeric film as defined in claim 13, wherein the crosslinker comprises a hydroxy acid.

15. A coated polymeric film as defined in claim 14, wherein the hydroxy acid contains a carboxylic acid group.

16. A coated polymeric film as defined in claim 13, wherein the crosslinker comprises glycolic acid.

17. A coated polymeric film as defined in claim 1, wherein the polymer film is laminated to a second polymer film, the coating being located in between the first polymer film and the second polymer film.

18. A coated polymeric film as defined in claim 17, wherein the second polymer film comprises a polyolefin.

19. A coated polymeric film as defined in claim 17, wherein the second polymer film comprises a polyethylene.

20. A coated polymeric film as defined in claim 1, wherein the copolymer of vinyl alcohol and the vinylamine is formed by hydrolyzing in water under a basic condition a N-vinylamide and a vinyl acetate.

21. A coated polymeric film as defined in claim 1, wherein the copolymer of vinyl alcohol and the vinylamine is formed by hydrolyzing the acetate functionality of a poly(vinyl acetate)-co-poly(N-vinyl formamide) in an alcohol medium to yield a vinyl alcohol copolymer and then hydrolyzing the vinyl alcohol copolymer as a slurry in an alcohol.

22. A coated polymeric film comprising:
a polymer film comprising a polyester polymer, the film having a first side and a second side; and
an oxygen barrier coating disposed on the first side of the polymeric film, the oxygen barrier coating having a thickness of less than about 0.5 microns, the oxygen barrier coating comprising a vinyl alcohol and vinylamine random copolymer, the barrier coating reducing the oxygen transmissivity of the film such that the coated polymeric film has an oxygen transmission rate of less than about 4 cc.mil/m$^2$/day/atm at 23° C. and 0% relative humidity, less than about 6 cc.mil/m$^2$/day/atm at 23° C. and 50% relative humidity, less than 8 cc.mil/m$^2$/day/atm at 23° C. and 60% relative humidity and less than about 20 cc.mil/m$^2$/day/atm at 23° C. and 70% relative humidity.

23. A coated polymeric film as defined in claim 22, wherein the copolymer of vinyl alcohol and a vinylamine comprises from about 8 mole percent to about 15 mole percent vinylamine.

24. A coated polymeric film as defined in claim 22, wherein the oxygen barrier coating further comprises a copolymer of a maleic acid and an acetic acid, the copolymer having an alternating structure, the barrier coating being crosslinked.

25. A coated polymeric film comprising:
a polymer film; and
a coating disposed on at least on side of the film, the coating comprising a first polymer reacted with a second polymer through the use of a crosslinker, the first polymer comprising a copolymer of vinyl alcohol and a vinylamine, the crosslinker comprising glycolic acid.

26. A coated polymeric film as defined in claim 25, wherein the second polymer comprises a copolymer of a maleic acid and an acrylic acid.

27. A coated polymeric film as defined in claim 25, wherein the polymer film comprises a polyester film.

28. A coated polymeric film as defined in claim 25, wherein the copolymer of vinyl alcohol and a vinylamine comprises from about 8 mole percent to about 15 mole percent vinylamine.

* * * * *